United States Patent
Jin et al.

(10) Patent No.: US 10,732,326 B2
(45) Date of Patent: *Aug. 4, 2020

(54) HYDROPHOBIC WINDOW, HOUSE AND VEHICLE USING THE SAME

(71) Applicants: Tsinghua University, Beijing (CN); HON HAI PRECISION INDUSTRY CO., LTD., New Taipei (TW)

(72) Inventors: Yuan-Hao Jin, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,936

(22) Filed: Dec. 17, 2018

(65) Prior Publication Data

US 2019/0212475 A1 Jul. 11, 2019

(30) Foreign Application Priority Data

Dec. 26, 2017 (CN) .......................... 2017 1 1433297

(51) Int. Cl.
 *E06B 9/00* (2006.01)
 *G02B 1/18* (2015.01)
 (Continued)

(52) U.S. Cl.
 CPC .............. *G02B 1/18* (2015.01); *B32B 17/064* (2013.01); *B60J 1/002* (2013.01); *B60S 1/026* (2013.01);
 (Continued)

(58) Field of Classification Search
 CPC ..... E06B 9/00; E06B 5/00; E06B 7/12; E06B 3/6715; E06B 1/64; E06B 1/34;
 (Continued)

(56) References Cited

U.S. PATENT DOCUMENTS 6,067,137 A * 5/2000 Ohnishi ............ G02F 1/133504
 349/112
8,734,929 B2 * 5/2014 Kim ........................ B05D 5/08
 428/141

(Continued)

FOREIGN PATENT DOCUMENTS

| CN | 101090586 A | 12/2007 |
|---|---|---|
| CN | 102365164 | 2/2012 |

(Continued)

OTHER PUBLICATIONS

"Super-hydrophobic Surface From Natural to Artificial", Jiang Lei et al., Modern Scientific Instruments, 2003, vol. 22:12, P1258-P1263;Dec. 30, 2003.

*Primary Examiner* — Beth A Stephan
(74) *Attorney, Agent, or Firm* — ScienBiziP, P.C.

(57) ABSTRACT

The disclosure relates to a hydrophobic window. The hydrophobic window includes a frame, a glass embedded in the frame, and a hydrophobic film on a surface of the glass. The hydrophobic film comprises a flexible substrate and a hydrophobic layer on a surface of the flexible substrate. The hydrophobic layer comprises a base and a patterned bulge layer on a surface of the base.

20 Claims, 18 Drawing Sheets

(51) Int. Cl.
*B60S 1/02* (2006.01)
*B60J 1/00* (2006.01)
*B32B 17/06* (2006.01)
*C03C 17/42* (2006.01)
*E06B 5/00* (2006.01)
*E06B 7/12* (2006.01)

(52) U.S. Cl.
CPC ............... *C03C 17/42* (2013.01); *E06B 5/00* (2013.01); *E06B 7/12* (2013.01); *E06B 9/00* (2013.01); *C03C 2217/76* (2013.01); *C03C 2218/355* (2013.01)

(58) Field of Classification Search
CPC ........ B60J 1/002; B60S 1/026; B32B 17/064; B32B 3/30; G02B 1/18; C03C 2217/76; C03C 2218/355; C09D 5/1681; B08B 17/06; B08B 17/065
USPC .................................................. 428/141–144
See application file for complete search history.

(56) References Cited

U.S. PATENT DOCUMENTS

| | | | |
|---|---|---|---|
| 2004/0256311 A1 | 12/2004 | Extrand | |
| 2005/0181195 A1* | 8/2005 | Dubrow | B05D 1/185 428/297.4 |
| 2005/0228491 A1* | 10/2005 | Snyder | A61F 2/06 623/1.46 |
| 2006/0078724 A1* | 4/2006 | Bhushan | B08B 17/06 428/323 |
| 2007/0031639 A1* | 2/2007 | Hsu | B05D 5/08 428/141 |
| 2007/0160790 A1* | 7/2007 | Kaneko | B05D 3/007 428/35.7 |
| 2007/0231542 A1* | 10/2007 | Deng | B08B 17/065 428/141 |
| 2007/0295714 A1 | 12/2007 | Liu et al. | |
| 2008/0296252 A1* | 12/2008 | D'Urso | B05D 5/083 216/11 |
| 2012/0003427 A1* | 1/2012 | Kuroda | B32B 7/02 428/141 |
| 2012/0052241 A1 | 3/2012 | King et al. | |
| 2012/0177881 A1 | 7/2012 | Lee et al. | |
| 2013/0247506 A1 | 9/2013 | Wiercinski et al. | |
| 2014/0011013 A1* | 1/2014 | Jin | B05D 5/08 428/297.4 |
| 2017/0044340 A1* | 2/2017 | Farah | C08J 7/04 |
| 2017/0050343 A1* | 2/2017 | Wei | B29C 33/3892 |
| 2017/0297293 A1 | 10/2017 | Kuroda et al. | |
| 2018/0112455 A1* | 4/2018 | Vos | E06B 1/64 |
| 2018/0227986 A1* | 8/2018 | Snider | H05B 3/86 |
| 2018/0326452 A1* | 11/2018 | Kobrin | C23C 18/165 |
| 2019/0210318 A1* | 7/2019 | Jin | B32B 7/12 |
| 2019/0210319 A1* | 7/2019 | Jin | B32B 3/30 |
| 2019/0210913 A1* | 7/2019 | Jin | B32B 17/10036 |
| 2019/0212475 A1 | 7/2019 | Jin et al. | |
| 2019/0212476 A1* | 7/2019 | Jin | B60S 1/026 |
| 2019/0227198 A1* | 7/2019 | Jin | G02B 1/18 |

FOREIGN PATENT DOCUMENTS

| | | | |
|---|---|---|---|
| CN | 102365164 A | 2/2012 | |
| CN | 102387915 | 3/2012 | |
| CN | 102387915 A | 3/2012 | |
| CN | 101481590 | 7/2012 | |
| CN | 102583214 A | 7/2012 | |
| CN | 103359684 A | 10/2013 | |
| CN | 205596377 | 9/2016 | |
| CN | 106398332 A | 2/2017 | |
| CN | 206248860 U | 6/2017 | |
| TW | 200500132 | 1/2005 | |
| TW | 201127636 | 8/2011 | |
| TW | 201609523 | 3/2016 | |
| TW | 201927719 | 7/2019 | |
| WO | WO-2017183701 A1 * | 10/2017 | ............... B60J 1/20 |

* cited by examiner

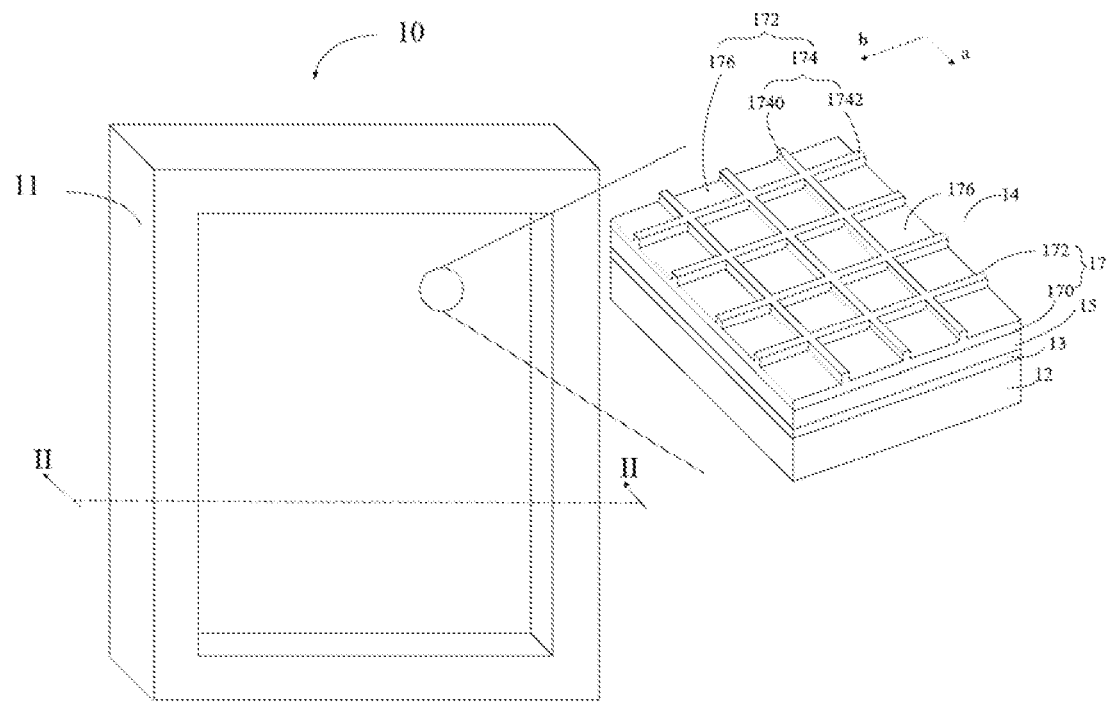
FIG. 1A
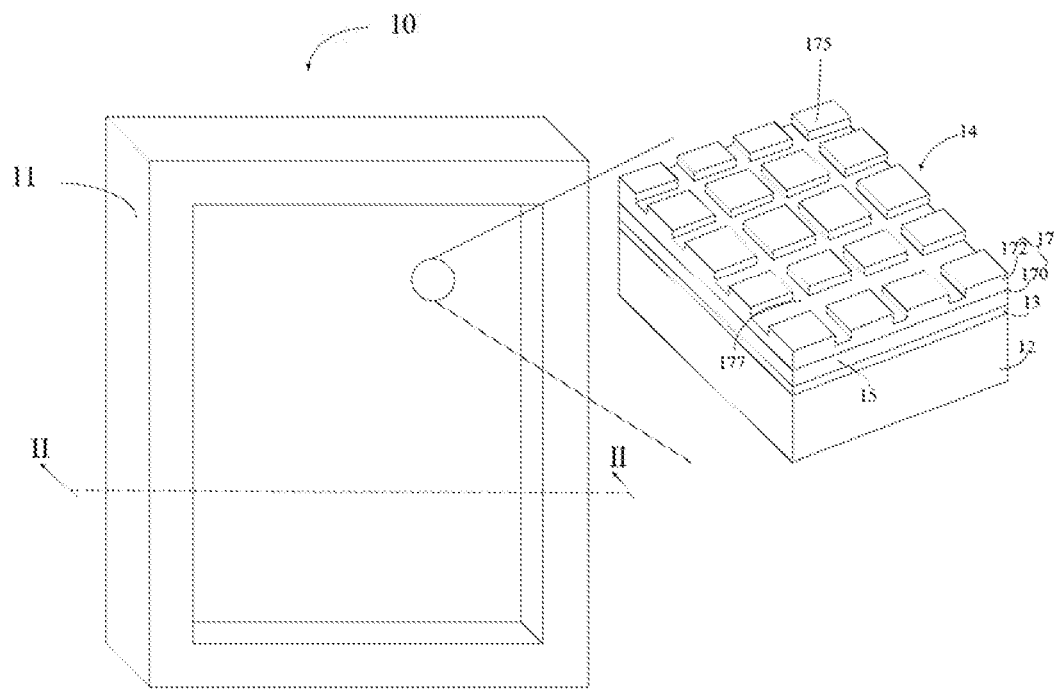
FIG. 1B
FIG. 1

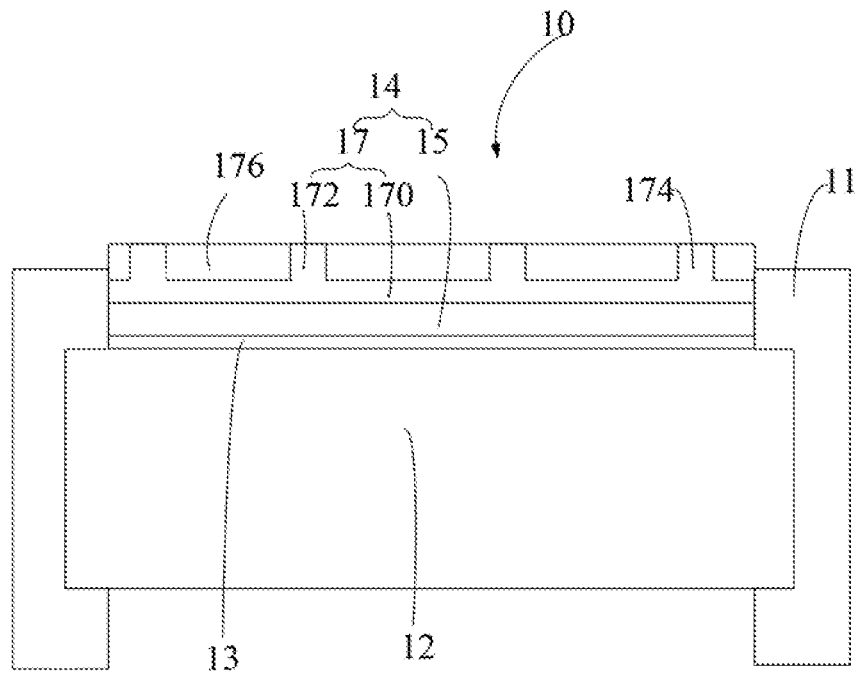
FIG. 2A
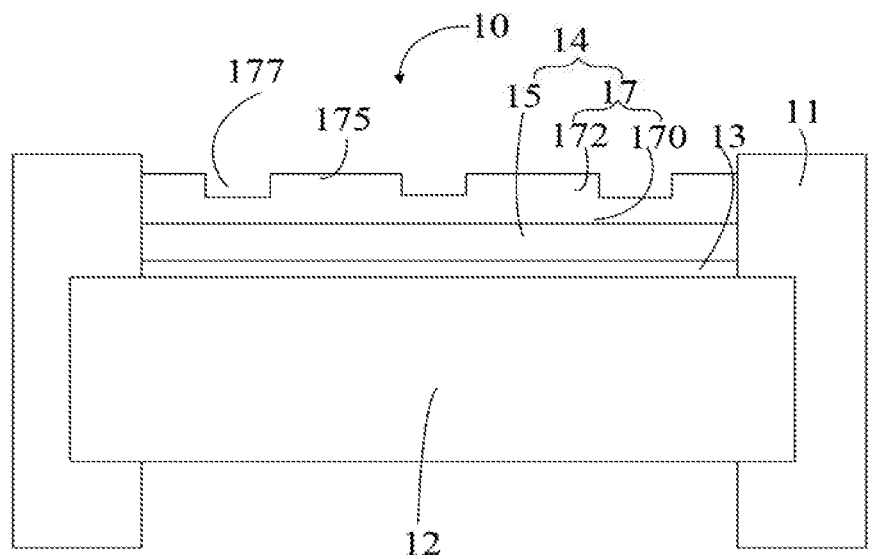
FIG. 2B
FIG. 2

US 10,732,326 B2

HYDROPHOBIC WINDOW, HOUSE AND VEHICLE USING THE SAME

This application claims all benefits accruing under 35 U.S.C. § 119 from China Patent Application No. 201711433297.0, filed on Dec. 26, 2017, in the China National Intellectual Property Administration, the disclosure of which is incorporated herein by reference. This application is related to applications entitled, "A HYDROPHOBIC FILM", filed Dec. 17, 2018, Ser. No. 16/221,955, "A HYDROPHOBIC MIRROR AND A VEHICLE USING THE SAME", filed Dec. 17, 2018 Ser. No. 16/221,947, "A HYDROPHOBIC FILM", filed Dec. 17, 2018 Ser. No. 16/221,964, "A HYDROPHOBIC WINDOW, A HOUSE AND A VEHICLE USING THE SAME), filed Dec. 17, 2018 Ser. No. 16/221,973, and "A HYDROPHOBIC MIRROR AND A VEHICLE USING THE SAME", filed Dec. 17, 2018 Ser. No. 16/221,982.

BACKGROUND

1. Technical Field

The present disclosure relates to a hydrophobic window, a house and a vehicle using the same.

2. Description of Related Art

Hydrophobic structure has important applications in daily life, such as windows, mirrors and so on. Existing hydrophobic windows are prepared by etching directly on the glass to form micro-structure and nano-structure, and the micro-structure and nano-structure make the surface of the glass hydrophobic. When the hydrophobic property of the hydrophobic window is weakened or the micro-structure and nano-structure are damaged, it is often necessary to replace the glass. Replacing the glass may be time-consuming and costly.

What is needed, therefore, is a hydrophobic window with a replaceable hydrophobic film.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 is a schematic view of a hydrophobic window, wherein FIG. 1A is a schematic view of one embodiment of the hydrophobic window, and FIG. 1B is a schematic view of another embodiment of the hydrophobic window. The structure of the patterned bulge layer 172 shown in FIG. 1A is complementary to the structure of the pattern bulge 172 shown in FIG. 1B.

FIG. 2 is a cross-sectional view, along a line II-II of FIG. 1, wherein FIG. 2A corresponds to FIG. 1A, and FIG. 2B corresponds to FIG. 1B.

DETAILED DESCRIPTION

Figure 3:
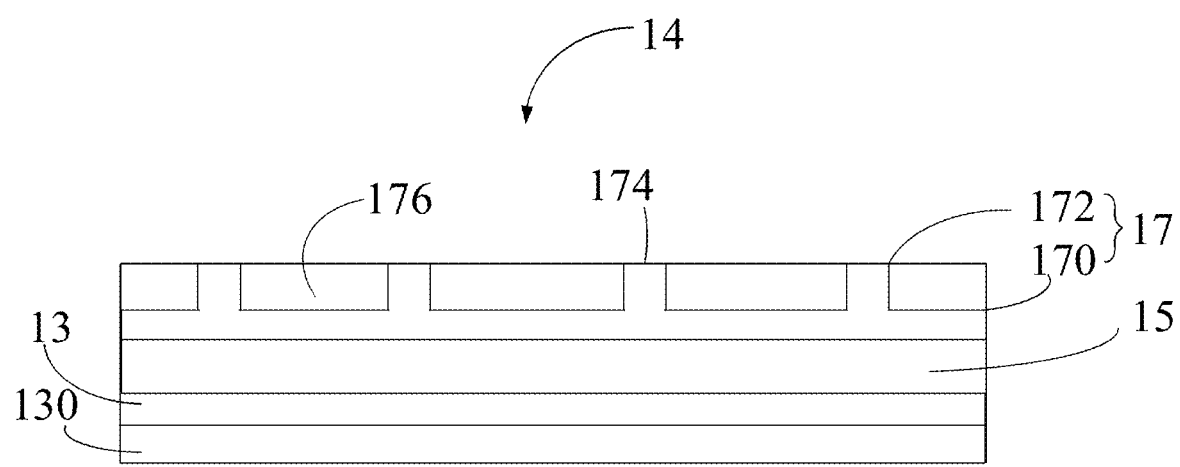
FIG. 3 is a schematic section view of one embodiment of a hydrophobic film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present hydrophobic film, a method for making the same, and an application of the same.

FIG. 1 and FIG. 2 show a hydrophobic window 10 of one embodiment. The hydrophobic window 10 comprises a window frame 11, a glass 12 embedded in the window frame 11, and a hydrophobic film 14 on a surface of the glass 12. The hydrophobic film 14 comprises a flexible substrate 15 and a hydrophobic layer 17 on a surface of the flexible substrate 15. The hydrophobic layer 17 comprises a base 170 and a patterned bulge layer 172 on the surface of the base 170 away from the flexible substrate 15.

Referring to FIG. 1A and FIG. 2A, the patterned bulge layer 172 can comprise a plurality of strip-shaped bulges 174 intersected with each other to form a net-like structure and define a plurality of holes 176. In one embodiment, the plurality of strip-shaped bulges 174 are an intergrated structure. Referring to FIG. 1B and FIG. 2B, the patterned bulge layer 172 can also comprise a plurality of bumps 175 spaced from each other to form a two-dimensional array and define a plurality of grooves 177. The illustration of the embodiment will take FIG. 1A and FIG. 2A as an example.

The hydrophobic film 14 can be applied to surfaces of the glass 12 through a transparent adhesive layer 13. Therefore, the hydrophobic film 14 can be replaced. When the hydrophobic film 14 is damaged, it may be more economical to replace the hydrophobic film 14 instead of replacing the whole glass 12. Referring to FIG. 3, the hydrophobic film 14 comprises a transparent adhesive layer 13 on the surface away from the flexible substrate 15 and a shielded layer 130 on the surface away from the adhesive layer 13. Thus, the hydrophobic film 14 can be pasted onto the surface of the glass 12 after removing the shielded layer 130. In this way, setting up an adhesive layer on the surface of the glass 12 temporarily can be avoided. It may be more convenient to store and carry by covering the adhesive layer 13 with the shielded layer 130.

The flexible substrate 15 is a flexible transparent film to make the hydrophobic film 14 have flexibility, so that the hydrophobic film 14 can be attached to a curved surface. Specifically, the material of the flexible substrate 15 can be polyethylene terephthalate (PET), polyimide (PI), polymethyl methacrylate (PMMA), polydimethylsiloxane (PDMS), or polyethylene naphthalate (PEN), etc. In one embodiment, the material of the flexible substrate 15 is polyethylene terephthalate. A shape, a size and a thickness of the flexible substrate 15 are not limited and can be selected according to applications. In one embodiment, the shape of the flexible substrate 15 is a rectangle with the thickness ranging from about 600 nanometers to about 8 millimeters. In one embodiment, the thickness of the flexible substrate 15 can range from about 800 nanometers to about 800 micrometers. In one embodiment, the thickness of the flexible substrate 15 can range from about 60 micrometers to about 300 micrometers.

The hydrophobic layer 17 comprises a base 170 and a patterned bulge layer 172 on the surface of the base 170 away from the flexible substrate 15. The patterned bulge layer 172 can comprise a plurality of strip-shaped bulges 174 intersected with each other to form a net-like structure and define a plurality of holes 176. The plurality of strip-shaped bulges 174 are an intergrated structure.

A shape and a size of the base 170 are not limited as long as the base 170 has two opposite surfaces. A thickness of the base 170 can range from about 70 nanometers to about 280 nanometers. In one embodiment, the thickness of the base 170 can range from about 120 nanometers to about 180 nanometers. If the thickness of the base 170 is too thin, such as less than 50 nanometers, it will increase the difficulty of the production process and reduce the mechanical strength of the hydrophobic film 14, which affects the service life of the hydrophobic film 14. If the thickness of the base 170 is too thick, such as more than 300 nanometers, the flexibility of the hydrophobic film 14 will be reduced. The base 170 and the patterned bulge layer 172 can be an integrated structure of a same material, or a multilayer structure of different materials. The material of the base 170 and the patterned bulge layer 172 can be an insulating material such as silicon dioxide ($SiO_2$) or silicon nitride ($Si_3N_4$), or a semiconductor material such as gallium nitride (GaN) or gallium arsenide (GaAs). In one embodiment, the base 170 and the patterned bulge 172 are an integrated structure with the same material silicon dioxide. The patterned bulge layer 172 is located on the surface of the base 170 away from the flexible substrate 15.

The patterned bulge layer 172 extends from one side of the base 170 to the other. The patterned bulge layer 172 comprises a plurality of strip-shaped bulges 174 consisting of first strip-shaped bulges 1740 and second strip-shaped bulges 1742. The first strip-shaped bulges 1740 are substantially parallel with each other and extends along the first direction, and the second strip-shaped bulges 1742 are substantially parallel with each other and extends along the second direction. The first direction is defined as the 'a' direction and the second direction is defined as the 'b' direction. An angle between the first direction and the second direction is greater than 0 degrees and less than or equal to 90 degrees. In one embodiment, the angle between the first direction and the second direction is greater than or equal to 30 degrees. In one embodiment, the angle between the first direction and the second direction is about 90 degrees. A length of each of the plurality of strip-shaped bulges 174 can be selected according to need. A width of each of the plurality of strip-shaped bulges 174 can range from about 25 nanometers to about 600 nanometers. In one embodiment, the width of each of the plurality of strip-shaped bulges 174 can range from about 30 nanometers to about 135 nanometers. A height of each of the plurality of strip-shaped bulges 174 can range from about 75 nanometers to about 800 nanometers. In one embodiment, the height of each of the plurality of strip-shaped bulges 174 can range from about 80 nanometers to about 400 nanometers. A spacing between the parallel and adjacent two of the plurality of strip-shaped bulges 174 can range from about 15 nanometers to about 800 nanometers. In one embodiment, the spacing can range from about 30 nanometers to about 350 nanometers. Therefore the opening size of each of the plurality of holes 176 can range from about 15 nanometers to about 800 nanometers. In one embodiment, the opening size of each of the plurality of holes 176 can range from about 30 nanometers to about 350 nanometers. In one embodiment, the width of each of the plurality of the strip-shaped bugles can range from about 50 nanometers to about 80 nanometers, the height of each of the plurality of the strip-shaped bugles can range from about 220 nanometers to about 300 nanometers, and the spacing between the parallel and adjacent strip-shaped bulges 174 can range from about 45 nanometers to about 60 nanometers. The structure of the patterned bulge layer 172 shown in FIG. 1A is complementary to the structure of the pattern bulge 172 shown in FIG. 1B. The plurality of strip-shaped bulges 174 shown in FIG. 1A correspond to the plurality of grooves 177 shown in FIG. 1B. The plurality of holes 176 shown in FIG. 1A correspond to the plurality of bumps 175 shown in FIG. 1B.

Figure 4:
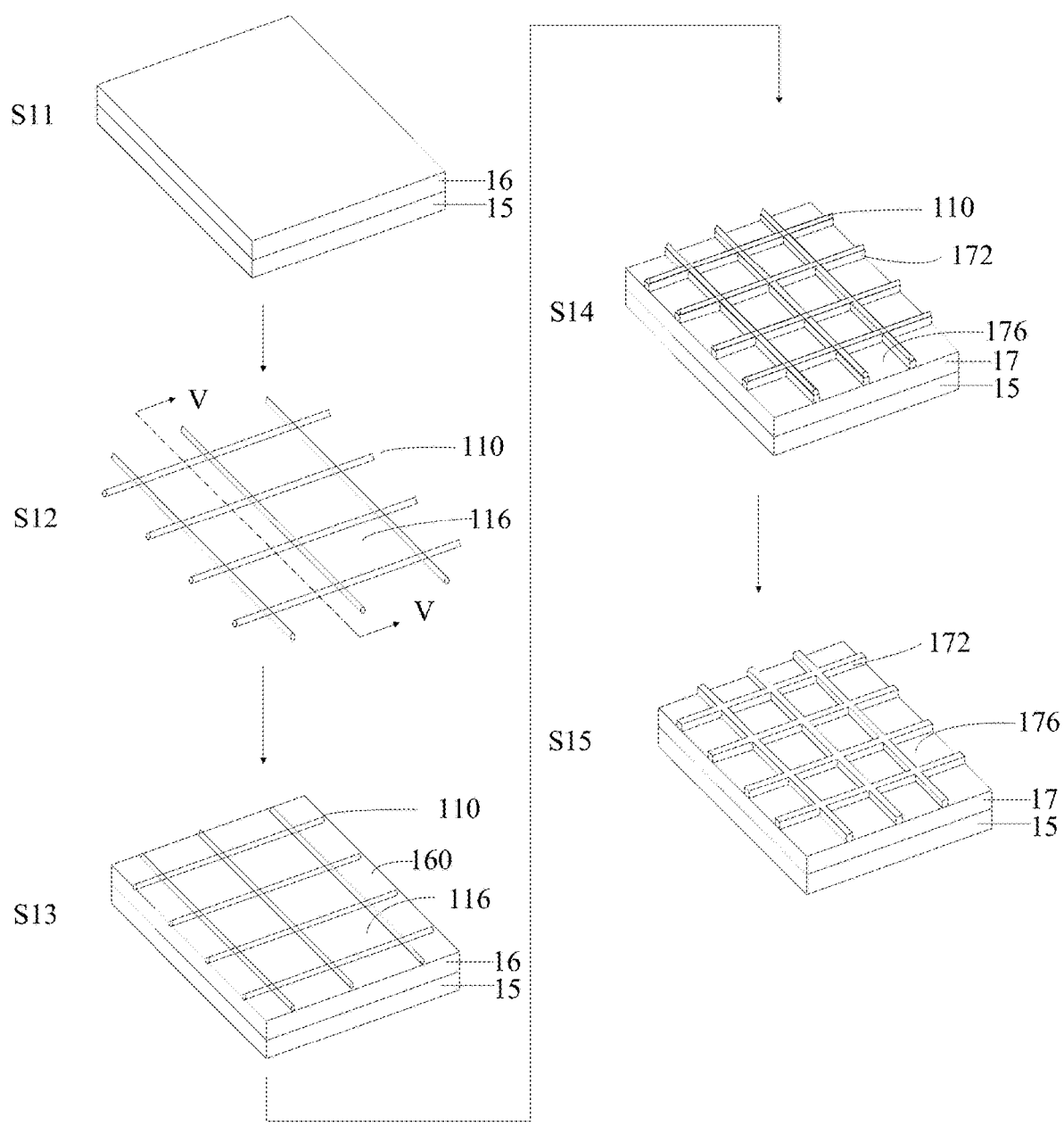
FIG. 4 is a schematic process flowchart of one embodiment of a method for producing a hydrophobic film.
Figure 5:
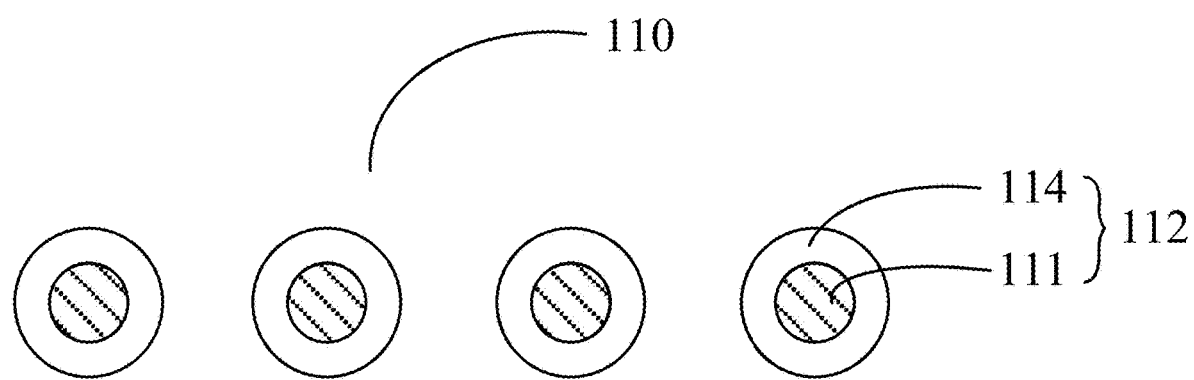
FIG. 5 is a cross-sectional view along line V-V of a carbon nanotube composite structure in S12 of FIG. 4.

Referring to FIGS. 4-5 together, a method for producing the hydrophobic film 14 of one embodiment includes the following steps:

(S11), placing a hydrophobic layer pre-form 16 on a surface of a flexible substrate 15;

(S12), providing a carbon nanotube structure 110, wherein the carbon nanotube structure 110 includes a plurality of carbon nanotubes intersected with each other and a plurality of openings 116 defined between the intersected carbon nanotubes;

(13), placing the carbon nanotube structure 110 on the surface 160 of the hydrophobic layer pre-form 16 away from the flexible substrate 15, wherein parts of the surface 160 are exposed from the plurality of openings 116;

(14), forming the hydrophobic layer 17 with the patterned bulge layer 172 by dry etching the hydrophobic layer pre-form 16 using the carbon nanotube structure 110 as a mask, wherein the patterned bulge layer 172 includes a plurality of strip-shaped bulges 174;

(15), removing the carbon nanotube structure 110.

In (S11), material of the hydrophobic layer pre-form 16 can be insulating material or semiconductor material. The insulating material can be silicon dioxide or silicon nitride. The semiconductor material can be silicon, gallium nitride or gallium arsenide. The hydrophobic layer pre-form 16 is directly formed on a surface of the flexible substrate 15 by a plasma chemical vapor deposition method. The method for forming the hydrophobic layer pre-form 16 is not limited to the above method.

In (S12), the carbon nanotube structure 110 can be a pure carbon nanotube structure 111 or a carbon nanotube composite structure 112. The pure carbon nanotube structure 111 means that the carbon nanotube structure 110 consists of a plurality of carbon nanotubes and does not include other structural components. The carbon nanotube composite structure 112 comprises a pure carbon nanotube structure 111 and a protective layer 114 coated on the pure carbon nanotube structure 111 as shown in FIG. 5. The protective layer 114 is coated on surfaces of the plurality of carbon nanotubes. In one embodiment, the protective layer 114 is coated on the surface of every carbon nanotube. The pure carbon nanotube structure 111 includes a plurality of carbon nanotubes. The plurality of carbon nanotubes are orderly arranged to form an ordered carbon nanotube structure and apertures are defined in the ordered carbon nanotube structure. The apertures extend throughout the pure carbon nanotube structure 111 from the thickness direction. The plurality of carbon nanotubes can be single-walled carbon nanotubes, double-walled carbon nanotubes, or multi-walled carbon nanotubes. The plurality of carbon nanotubes are parallel to a surface of the pure carbon nanotube structure 111. The surface is the largest surface of the carbon nanotube structure 111 formed by arranging the plurality of carbo nanotubes substantially parallel in the surface. A length and a diameter of the carbon nanotubes can be selected according to applications. The diameters of the single-walled carbon nanotubes range from about 0.5 nanometers to about 10 nanometers. The diameters of the double-walled carbon nanotubes can range from about 1.0 nanometer to about 15 nanometers. The diameters of the multi-walled carbon nanotubes can range from about 1.5 nanometers to about 500 nanometers. The length of the carbon nanotubes can be greater than 50 micrometers. In one embodiment, the length of the carbon nanotubes can range from about 200 micrometers to about 900 micrometers.

The pure carbon nanotube structure 111 comprises a plurality of carbon nanotubes. The plurality of carbon nanotubes are orderly arranged to form an ordered carbon nanotube structure and define apertures. The apertures can be a plurality of holes defined by several adjacent carbon nanotubes intersected with each other or a plurality of gaps defined by adjacent two substantially parallel arranged carbon nanotubes and extending along an axial direction of the carbon nanotubes. The plurality of holes and the plurality of gaps can co-exist in the pure carbon nanotube structure 111. Hereafter, a size of each of the plurality of apertures is the diameter of the hole or a width of the gap. The sizes of the apertures can be different. The sizes of the apertures can range from about 2 nanometers to about 500 micrometers, or about 20 nanometers to about 60 micrometers, or about 80 nanometers to about 5 micrometers, or about 200 nanometers to about 1.5 micrometers. The sizes refer to the diameters of the holes or the distances between the gaps in the width direction.

The plurality of carbon nanometers are orderly arranged to form an ordered carbon nanotube structure. The plurality of carbon nanotubes extend along a direction substantially parallel to the surface of the pure carbon nanotube structure 111. The term 'ordered carbon nanotube structure' includes, but is not limited to, a structure wherein the plurality of carbon nanotubes are arranged in a consistently systematic manner, e.g., the plurality of carbon nanotubes are arranged approximately along the same direction. The plurality of carbon nanotubes are tightly connected by Van der Waals forces, so that the pure carbon nanotube structure 111 and the carbon nanotube composite structure 112 are a free-standing structure. The term "free-standing" indicates that the carbon nanotube structure 110 can sustain a weight of itself when it is hoisted a portion thereof without any significant damage to its structural integrity. Thus, the carbon nanotube structure 110 can be suspended by two supports space apart.

The pure carbon nanotube structure 111 comprises at least one carbon nanotube film, at least one carbon nanotube wire, or the combination thereof. In one embodiment, the pure carbon nanotube structure 111 comprises a single carbon nanotube film or two or more carbon nanotube films stacked together. Thus, the thickness of the carbon nanotube structure 111 can be controlled by a number of the stacked carbon nanotube films. The carbon nanotube film includes a plurality of uniformly distributed carbon nanotubes. The plurality of uniformly distributed carbon nanotubes are arranged approximately along the same direction. In one embodiment, the pure carbon nanotube structure 111 is formed by folding a single carbon nanotube wire. The carbon nanotube wire can be untwisted or twisted. In one embodiment, the pure carbon nanotube structure 111 can include a layer of parallel and spaced carbon nanotube wires. In another embodiment, the pure carbon nanotube structure 111 can include a plurality of carbon nanotube wires intersected or weaved together to form a carbon nanotube net-like structure. A distance between two adjacent parallel and spaced carbon nanotube wires can range from about 1 nanometer to about 0.5 micrometers. Gaps between two adjacent substantially parallel carbon nanotube wires are defined as the apertures. The sizes of the apertures can be controlled by controlling the distances between two adjacent parallel and spaced carbon nanotube wires. The lengths of the gaps between two adjacent parallel carbon nanotube wires can be equal to the lengths of the carbon nanotube wires. It is understood that any carbon nanotube structure as described above can be used with all embodiments.

Figure 6:
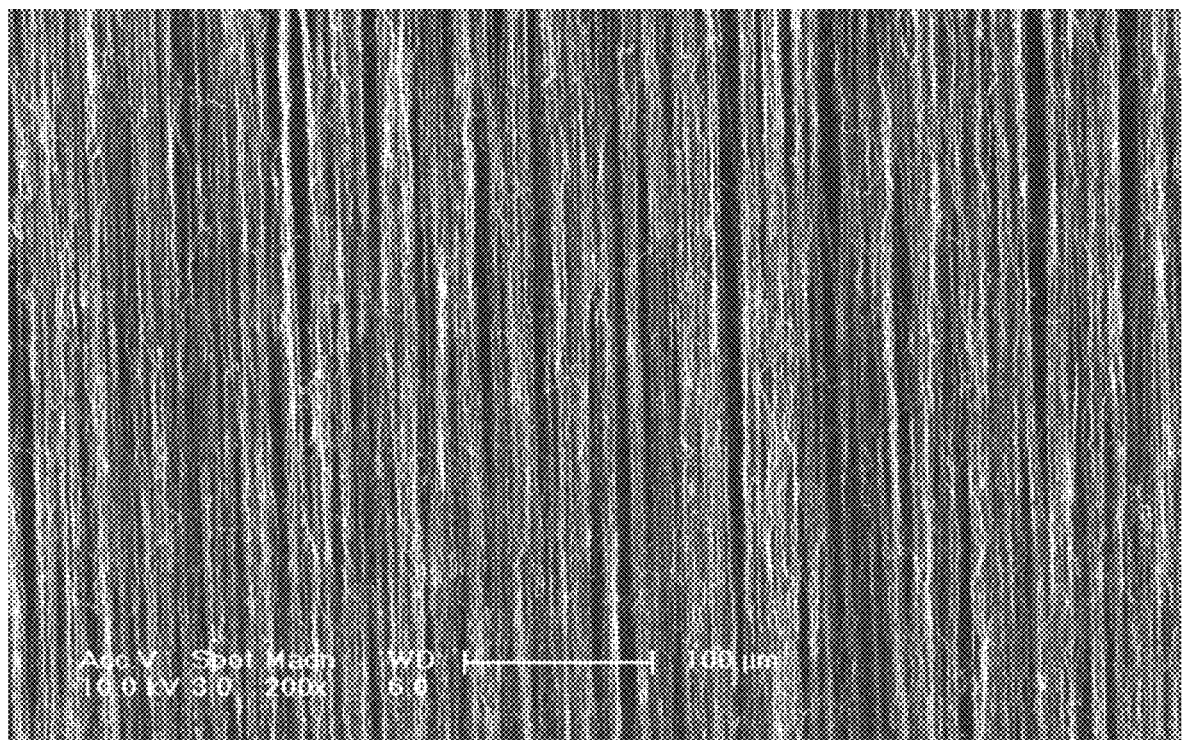
FIG. 6 is a Scanning Electron Microscope (SEM) image of a drawn carbon nanotube film of one embodiment.

In one embodiment, the pure nanotube structure 111 includes at least one drawn carbon nanotube film. The drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing structure. FIG. 6, each of the drawn carbon nanotube films includes a plurality of successively oriented carbon nanotube segments joined end-to-end and side-by-side by van der Waals attractive force therebetween. Each of the carbon nanotube segments includes a plurality of carbon nanotubes parallel to each other, and joined by van der Waals attractive force therebetween. As can be seen in FIG. 6, some variations can occur in the drawn carbon nanotube film. The carbon nanotubes in the drawn carbon nanotube film are oriented along a preferred orientation. The drawn carbon nanotube film can be treated with an organic solvent to increase a mechanical strength and a toughness and to reduce a coefficient of friction of the drawn carbon nanotube film. Diameters of carbon nanotube segments can range from about 10 nanometers to 200 nanometers. In one embodiment, the diameters of nanotube segments can range from about 10 nanometers to 100 nanometers. The drawn carbon nanotube film defines apertures between adjacent carbon nanotubes. The apertures extend throughout the drawn carbon nanotube film along the thickness direction thereof. The apertures can be micro pores or gaps. In one embodiment, the pure carbon nanotube structure 111 includes one drawn carbon nanotube film. Gaps are defined between the adjacent carbon nanotube segments in the carbon nanotube film. Sizes of the gaps can range from about 1 nanometer to 0.5 micrometers.

The pure carbon nanotube structure 111 can also include at least two of the drawn carbon nanotube films stacked together. In other embodiments, the pure carbon nanotube structure 111 can include two or more of the carbon nanotube films which coplanar arranged. Additionally, when the carbon nanotubes in the carbon nanotube film are aligned along the preferred orientations (e.g., the drawn carbon nanotube film), an angle can exist between the preferred orientations of adjacent carbon nanotubes films, whether the carbon nanotube films are stacked together or arranged side-by-side. Adjacent carbon nanotube films can be joined by the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of micro pores are defined by the pure carbon nanotube structure 111. In one embodiment, the pure carbon nanotube structure 111 has the aligned directions of the carbon nanotubes between adjacent stacked drawn carbon nanotube films at 90 degrees. Diameters of the micro pores can range from about 1 nanometer to about 0.5 micrometers. The thickness of the pure carbon nanotube structure 111 can range from about 0.01 micrometers to about 100 micrometers. Stacking the carbon nanotube films will also add to the structural integrity of the pure carbon nanotube structure 111.

Figure 7:
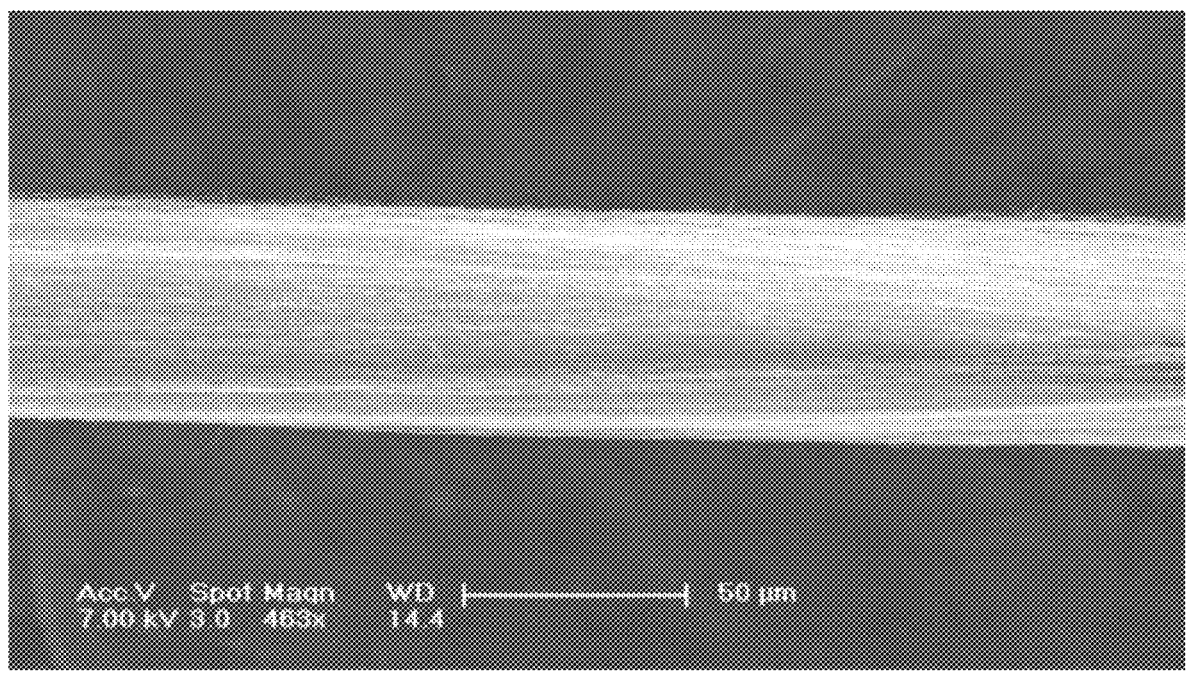
FIG. 7 is a SEM image of an untwisted carbon nanotube wire of one embodiment.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to surface tensions of the organic solvent as it volatilizes, and thus, the drawn carbon nanotube film will shrunk into an untwisted carbon nanotube wire. Referring to FIG. 7, the untwisted carbon nanotube wire includes a plurality of carbon nanotubes substantially oriented along the same direction (i.e., a direction along a length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each of the carbon nanotube segments includes a plurality of carbon nanotubes substantially parallel to each other, and joined by van der Waals attractive force therebetween. The carbon nanotube segments can vary in width, thickness, uniformity, and shape. The length of the untwisted carbon nanotube wire can be arbitrarily set as required. A diameter of the untwisted carbon nanotube wire can range from about 0.5 nanometers to about 100 micrometers.

Figure 8:
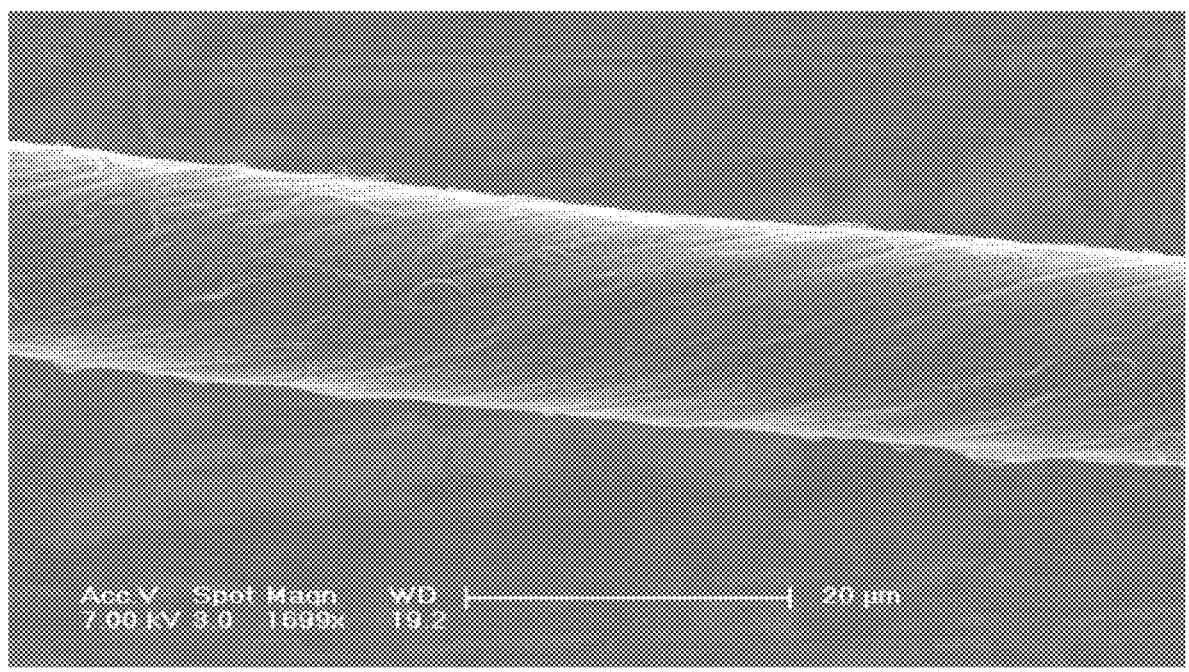
FIG. 8 is a SEM image of a twisted carbon nanotube wire of one embodiment.

The twisted carbon nanotube wire can be formed by twisting a drawn carbon nanotube film by mechanical forces to turn the two ends of the drawn carbon nanotube film in opposite directions. Referring to FIG. 8, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each of the carbon nanotube segments includes a plurality of carbon nanotubes parallel to each other, and joined by van der Waals attractive force therebetween. The length of the carbon nanotube wire can be set as required. A diameter of the twisted carbon nanotube wire can be from about 0.5 nanometers to about 100 micrometers. Further, the twisted carbon nanotube wire can be treated with a volatile organic solvent after being twisted to bundle the adjacent paralleled carbon nanotubes together. A specific surface area of the twisted carbon nanotube wire will decrease, while a density and strength of the twisted carbon nanotube wire will increase.

The carbon nanotube composite structure 112 can be made by applying a protective layer 114 on surfaces of the pure carbon nanotube structure 111. In one embodiment, the pure carbon nanotube structure 111 can include two stacked drawn carbon nanotube films, wherein the stacked drawn carbon nanotube films are vertically intersected. The pure carbon nanotube structure 111 can be suspended in a depositing chamber during deposition of the protective layer 114 so that two opposite surfaces of the pure carbon nanotube structure 111 are coated with the protective layer 114. In some embodiments, each of the plurality of carbon nanotubes is fully enclosed by the protective layer 114. In one embodiment, the carbon nanotube composite structure 112 is placed on a frame so that a middle portion of the carbon nanotube composite structure 112 is suspended through the through hole of the frame. The frame can be any shape, such as a quadrilateral. The carbon nanotube composite structure 112 can also be suspended by a metal mesh or metal ring.

The method of depositing the protective layer 114 can be physical vapor deposition (PVD), chemical vapor deposition (CVD), atomic layer deposition (ALD), magnetron sputtering, or spraying.

The plurality of openings 116 are defined by the plurality of apertures of the pure carbon nanotube structure 111. The plurality of openings 116 of the carbon nanotube composite structure 112 and the plurality of apertures of the pure carbon nanotube composite structure 111 may have a same shape but different in size. The sizes of the plurality of openings 116 of the carbon nanotube composite structure 112 are smaller than those of the plurality of apertures because the protective layer 114 is deposited in the plurality of apertures.

A thickness of the protective layer 114 can range from about 5 nanometers to about 150 nanometers. In one embodiment, the thickness of the protective layer 114 can range from about 8 nanometers to about 45 nanometers. If the thickness of the protective layer 114 is less than 5 nanometers, the protective layer 114 cannot prevent the carbon nanotubes from being destroyed in following etching process. If the thickness of the protective layer 114 is greater than 150 nanometers, the plurality of apertures may be fully filled by the protective layer 114 and the plurality of openings 116 cannot be obtained.

The material of the protective layer 114 can be metal, metal oxide, metal nitride, metal carbide, metal sulfide, silicon oxide, silicon nitride, or silicon carbide. The metal can be gold, nickel, titanium, iron, aluminum, titanium, chromium, or alloy thereof. The metal oxide can be alumina, magnesium oxide, zinc oxide, or hafnium oxide. The material of the protective layer 114 is not limited above and can be any material as long as the material can be deposited on the pure carbon nanotube structure 111, would not react with the carbon nanotubes and would not be etched easily in following drying etching process. The protective layer 114 is combined with the carbon nanotube structure 111 by van der Waals attractive force therebetween only.

Figure 9:
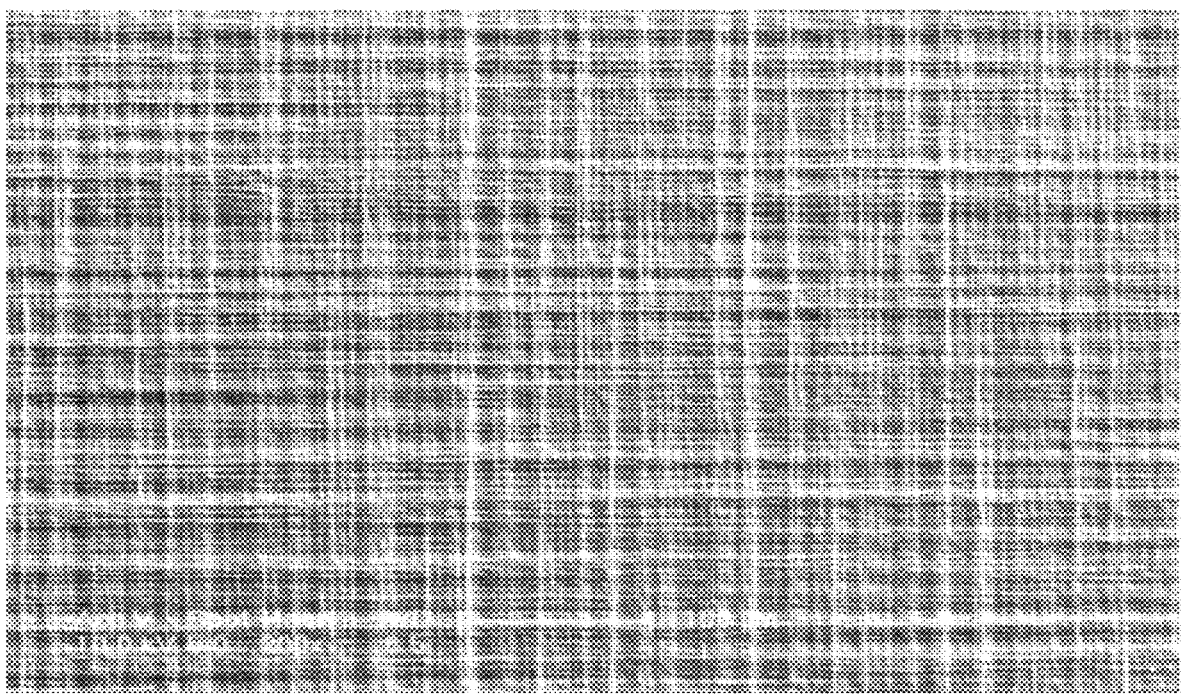
FIG. 9 is a SEM image of a carbon nanotube composite structure of one embodiment.
Figure 10:
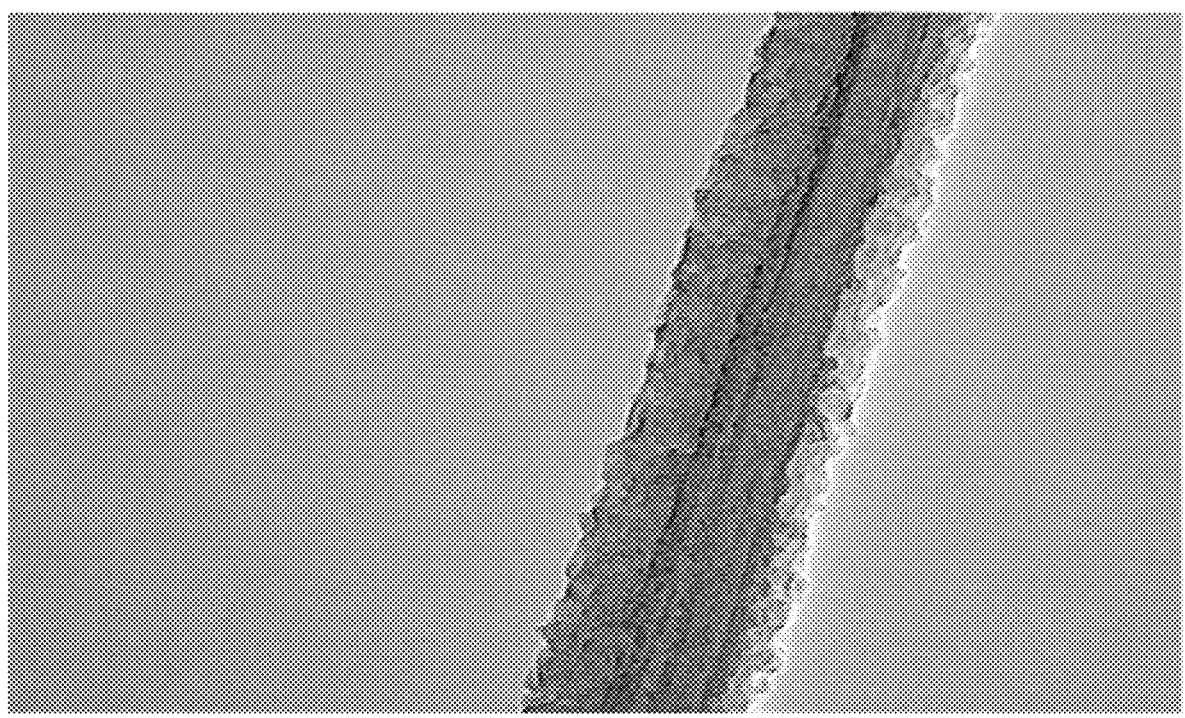
FIG. 10 is a SEM image of a single carbon nanotube coated with an alumina ($Al_2O_3$) layer.

As shown in FIG. 9, in one embodiment, an alumina layer of 5 nanometers thickness is deposited on two stacked drawn carbon nanotube films by electron beam evaporation. As shown in FIG. 10, each of the carbon nanotubes is entirely coated by the alumina layer. The aligned direction of the carbon nanotubes between adjacent stacked drawn carbon nanotube films is 90 degrees.

In (S13), the carbon nanotube structure 110 can directly contact with the surface 160 of the hydrophobic layer pre-form 16 or suspended above the surface 160 of the hydrophobic layer pre-form 16 by a support. In one embodiment, the carbon nanotube structure 110 is transferred on the surface 160 of the hydrophobic layer pre-form 16 through the frame.

In one embodiment, the carbon nanotube composite structure 112 is adopted. The placing the carbon nanotube composite structure 112 on the surface 160 further comprises solvent treating the hydrophobic layer pre-form 16 with the carbon nanotube composite structure 112 thereon. Because air is trapped between the carbon nanotube composite structure 112 and the surface 160 of the hydrophobic layer pre-form 16, the solvent treating can exhaust the air and allow the carbon nanotube composite structure 112 to be closely and firmly adhered on the surface 160 of the hydrophobic layer pre-form 16. The solvent treating can be carried out by applying a solvent to entire surface of the carbon nanotube composite structure 112 or immersing an entire hydrophobic layer pre-form 16 with the carbon nanotube composite structure 112 in a solvent. The solvent can be water or volatile organic solvent such as ethanol, methanol, acetone, dichloroethane, chloroform, or mixtures thereof. In one embodiment, the organic solvent is ethanol.

In (S14), the dry etching can be plasma etching or reactive ion etching (RIE). In one embodiment, the dry etching is performed by applying plasma energy on the entire or part surface of the surface 160 via a plasma device. A plasma gas can be an inert gas and/or etching gases, such as argon (Ar), helium (He), chlorine ($Cl_2$), hydrogen ($H_2$), oxygen ($O_2$), fluorocarbon ($CF_4$), ammonia ($NH_3$), or air.

In one embodiment, the plasma gas is a mixture of chlorine and argon. The power of the plasma device can range from about 20 watts to about 70 watts. The plasma flow of chlorine can range from about 5 standard cubic centimeters per minutes (sccm) to about 20 sccm, such as 10 sccm. A plasma flow of argon can range from about 15 sccm to about 40 sccm, such as 25 sccm. When the plasma is produced in vacuum, a work pressure of the plasma can range from about 2 Pa to 10 Pa, such as 6 Pa. A time period for plasma etching can range from about 10 seconds to about 400 seconds, such as 20 seconds.

In the plasma etching process, the plasma gas would react with the exposed portion of the hydrophobic layer pre-form 16 and would not react with the protective layer 114, or reaction between the plasma gas and the protective layer 114 is much slower than reaction between the plasma gas and the hydrophobic layer pre-form 16. The selection relationship of the plasma gas, material of the hydrophobic layer pre-form 16 and material of the protective layer 114 is shown in Table 1 below.

TABLE 1

| Number | Hydrophobic layer pre-form | Protective layer | Plasma gas |
|---|---|---|---|
| 1 | Al | $SiO_2$ | $Cl_2$ or $BCl_3$ |
| 2 | $SiO_2$ | Al, Cr, Fe, Ti, Ni, or Au | $CF_4$ |
| 3 | $SiN_x$ | Al, Cr, Fe, Ti, Ni, or Au | $CF_4$ |
| 4 | GaN | $Al_2O_3$ | $Cl_2$ or $Ar_2$ |
| 5 | Au, Cr or Ni | $SiO_2$ or $SiN_x$ | $O_2$ or $Ar_2$ |
| 6 | Cu | $SiO_2$ or $SiN_x$ | $O_2$ or $BCl_3$ |

In the etching process, the etching gas reacts with the hydrophobic layer pre-form 16, but does not react with the protective layer 114 or react with the protective layer 114 at a speed much less than that of the reaction between the etching gas and the hydrophobic layer pre-form 16. Thus, the exposed portion of the hydrophobic layer pre-form 16 would be etched gradually and the portion of the hydrophobic layer pre-form 16 that are shielded by the carbon nanotube composite structure 112 would not be etched.

The patterned bulge layer 172 and the carbon nanotube composite structure 112 substantially have the same pattern. When the carbon nanotube structure 112 includes a plurality of intersected drawn carbon nanotube films, the patterned bulge layer 172 includes a plurality of strip-shaped bulges 174 intersected with each other to form a net-like structure as shown in FIG. 1A.

The plurality of strip-shaped bulges 174 can have a width ranging from about 25 nanometers to about 600 nanometers, a distance between the two adjacent strip-shaped bulges in width direction ranging from about 15 nanometers to about 800 nanometers, and a height ranging from about 75 nanometers to about 800 nanometers. In one embodiment, the plurality of strip-shaped bulges 174 can have a width ranging from about 30 nanometers to about 135 nanometers, a distance between the two adjacent strip-shaped bulges in width direction ranging from about 30 nanometers to about 200 nanometers, and a height ranging from about 80 nanometers to about 400 nanometers. In other embodiment, the plurality of strip-shaped bulges 174 can have a width ranging from about 30 nanometers to about 80 nanometers, a distance between the two adjacent strip-shaped bulges in width direction ranging from about 40 nanometers to about 80 nanometers, and a height ranging from about 120 nanometers to about 300 nanometers.

Figure 11:
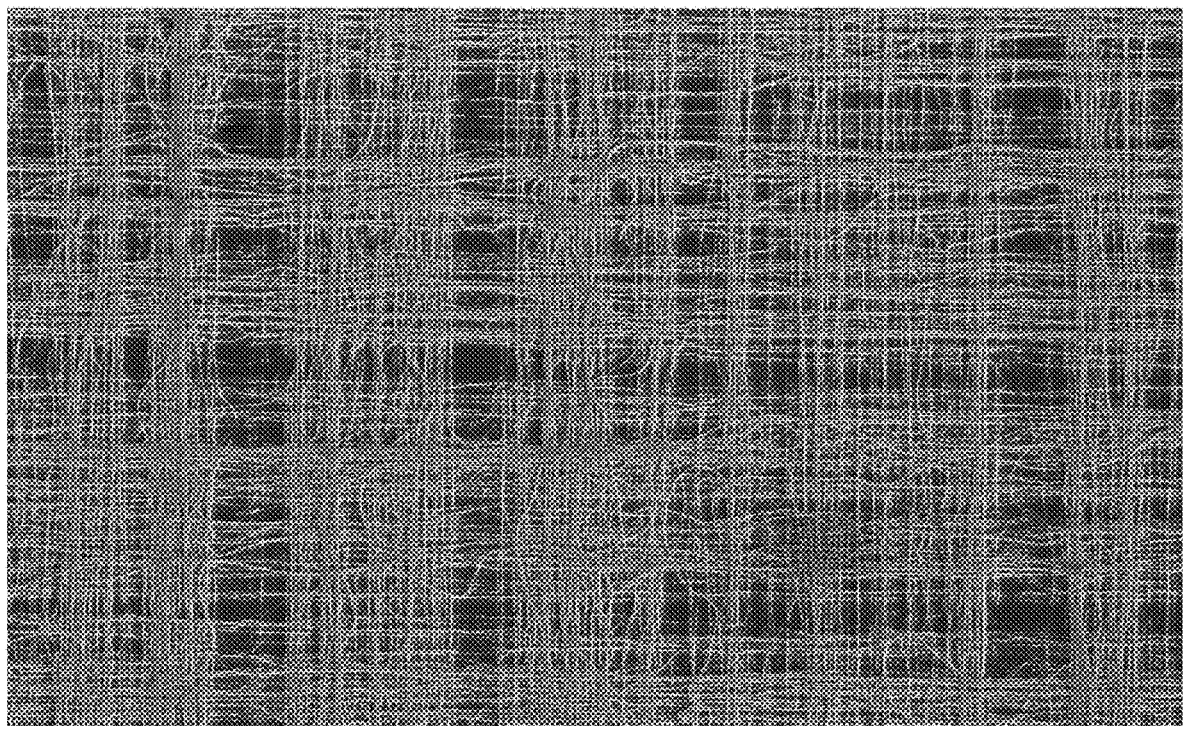
FIG. 11 is a SEM image of the hydrophobic film according to FIG. 1.
Figure 12:
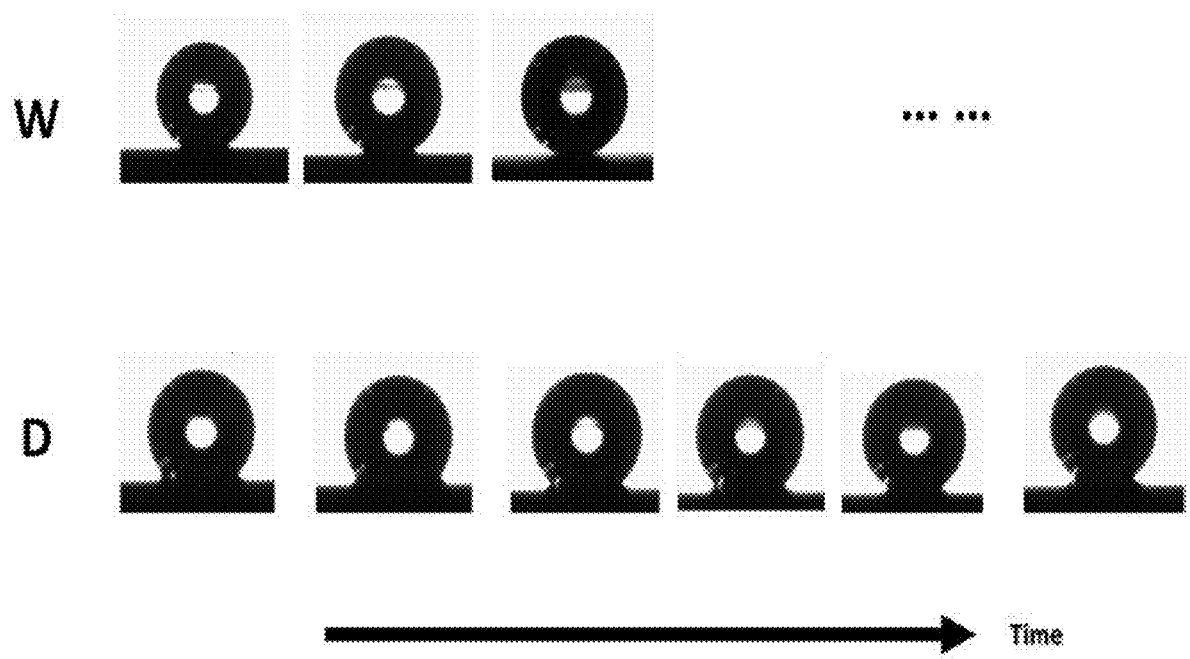
FIG. 12 is a performance test chart of the hydrophobic film according to FIG. 1.

After coating with the protective layer 114, the diameters of the carbon nanotubes are about tens of nanometers, and distances between adjacent two carbon nanotubes are about tens of nanometers. Thus, the widths and distances of the plurality of strip-shaped bulges 174 are also tens of nanometers, and the average diameter of the plurality of holes 176 are also tens of nanometers, as shown in FIG. 11. The density of the strip-shaped bulges 174 and the holes 176 would be increased. For example, when both the width and distance of the plurality of strip-shaped bulges 174 are 25 nanometers, the number of the strip-shaped bulges 174 and the holes 176 would be 40 within 1 micrometer. The conventional photolithography method cannot make all the strip-shaped bulges 174 in nano-scale and obtain this density due to the resolution limitation. FIG. 12, the hydrophobic property of the hydrophobic film. "W" refers to static contact angle, and "D" refers to dynamic scroll angle.

In (S15), the method of removing the carbon nanotube composite structure 112 can be ultrasonic method, or adhesive tape peeling, oxidation. In one embodiment, the hydrophobic film 14 with the carbon nanotube composite structure 112 thereon is placed in an N-methyl pyrrolidone solution and ultrasonic treating for several minutes.

The hydrophobic film made by the method as disclosed has the following characters. Firstly, the flexible substrate 15 makes the hydrophobic film 14 have flexibility. Secondly, the hydrophobic property of the hydrophobic will be outstandingly enhanced for the reason that the width and distance of the plurality of strip-shaped bulges 174 are tens of nanometers. Thirdly, the carbon nanotube structure is used as a frame to prepare a mask layer, so that it is easy to make patterned bulge. In addition, the preparation method of the disclosure is simple, efficient, and easy to be industrialized.

Figure 13:
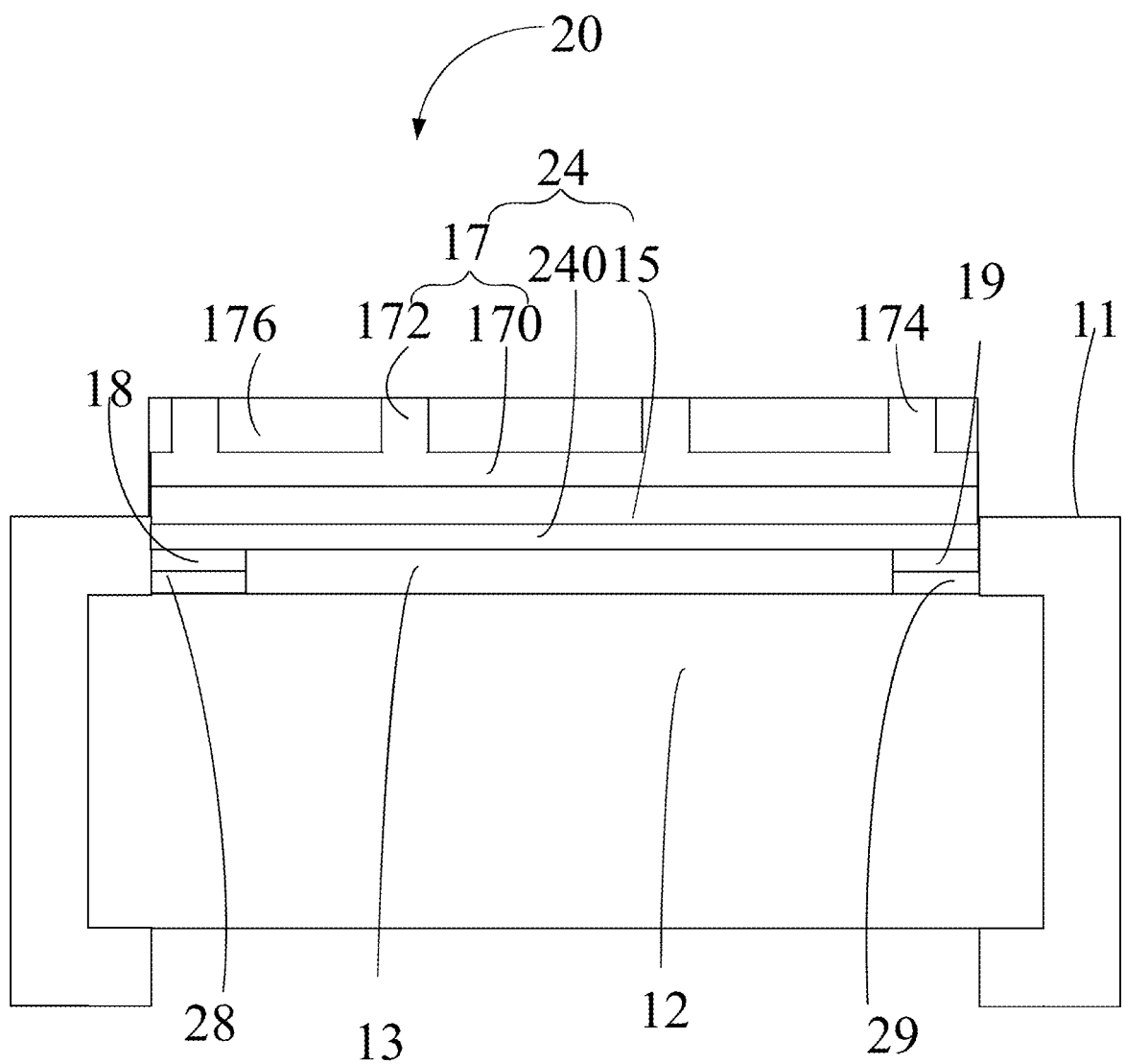
FIG. 13 is a schematic section view of a hydrophobic window of another embodiment.

Referring to FIG. 13, a hydrophobic window 20 of another embodiment is provided. The hydrophobic window 20 comprises a window frame 11, a glass 12 embedded in the window frame 11, and a hydrophobic film 24 on a surface of the glass 12. The hydrophobic window 20 is similar to the hydrophobic window 10 except that the hydrophobic film 24 further comprises a heating layer 240, a first electrode 18 and a second electrode 19. The hydrophobic window 20 further comprises a third electrode 28 and a fourth electrode 29 spaced apart from each other and both located on the glass 12. The heating layer 240 is located on the surface of the flexible substrate 15 away from the hydrophobic layer 17 and set between the flexible substrate 15 and the adhesive layer 13. The first electrode 18 is spaced apart from the second electrode 19 to prevent a short circuit of the electrodes. The first electrode 18 and the second electrode 19 are electrically connected to and in direct contact with the heating layer 240. The first electrode 18 is also electrically connected to and in direct contact with the third electrode 28, and the second electrode 19 is also electrically connected to and in direct contact with the fourth electrode 29. The flexible substrate 15 and the hydrophobic layer 17 should have good thermal conductivity. The heating layer 240 can be a transparent conductive layer and can be made of indium tin oxide (ITO), carbon nanotubes and so on. In one embodiment, the heating layer 240 is a carbon nanotube film.

The first electrode 18, the second electrode 19, the third electrode 28, and the fourth electrode 29 should have good conductive properties. The first electrode 18, the second electrode 19, the third electrode 28, and the fourth electrode 29 can be conductive films, metal sheets, or metal lines, and can be made of pure metals, metal alloys, indium tin oxide (ITO), antimony tin oxide (ATO), silver paste, conductive polymer, and metallic carbon nanotubes, and combinations thereof. The pure metals and metal alloys can be aluminum, copper, tungsten, molybdenum, gold, titanium, neodymium, cesium, palladium, or combinations thereof. The shape of the first electrode 18 or the second electrode 19 is not limited and can be for example, lamellar, rod, wire, or block shaped. In the embodiment, the first electrode 18, the second electrode 19, the third electrode 28, and the fourth electrode 29 are made of ITO, and are all transparent.

The first electrode 18 and the second electrode 19 can be electrically attached to and fixed on the heating layer 240 by a conductive adhesive (not shown), such as silver adhesive. In some embodiments, the first electrode 18 and the second electrode 19 can be adhered directly to the heating layer 240 because carbon nanotube films have a large specific surface area and are adhesive in nature. The third electrode 28, and the fourth electrode 29 are fixed on the glass 12. After the hydrophobic film 24 is removed from the glass 12, the first electrode 18 and the second electrode 19 are separated from the third electrode 28, and the fourth electrode 29. The third electrode 28 and the fourth electrode 29 are retained on the surface of the glass 12.

In use, the third electrode 28 and the fourth electrode 29 are electrically connected to a power source. The power source can be a battery located in a space defined by the window frame 11. The first electrode 18 is electrically connected to and in direct contact with the third electrode 28, and the second electrode 19 is electrically connected to and in direct contact with the fourth electrode 29. Therefore, the carbon nanotube films have a current passing through and generate heat. Then, the heat is transmitted to the hydrophobic layer 17. Water on the surface of the hydrophobic layer 17 will evaporate. Since the carbon nanotube films have good electrical conductivity, thermal stability and high efficiency of electro-thermal conversion, the hydrophobic film 24 have a high efficiency of electro-thermal conversion.

The hydrophobic window 20 can be applied to automobile window. Rain drops on the glass may affect the drivers in rainy days. The use of the hydrophobic window 20 can prevent the rain gathering by evaporating the raindrops on the glass quickly.

Figure 14:
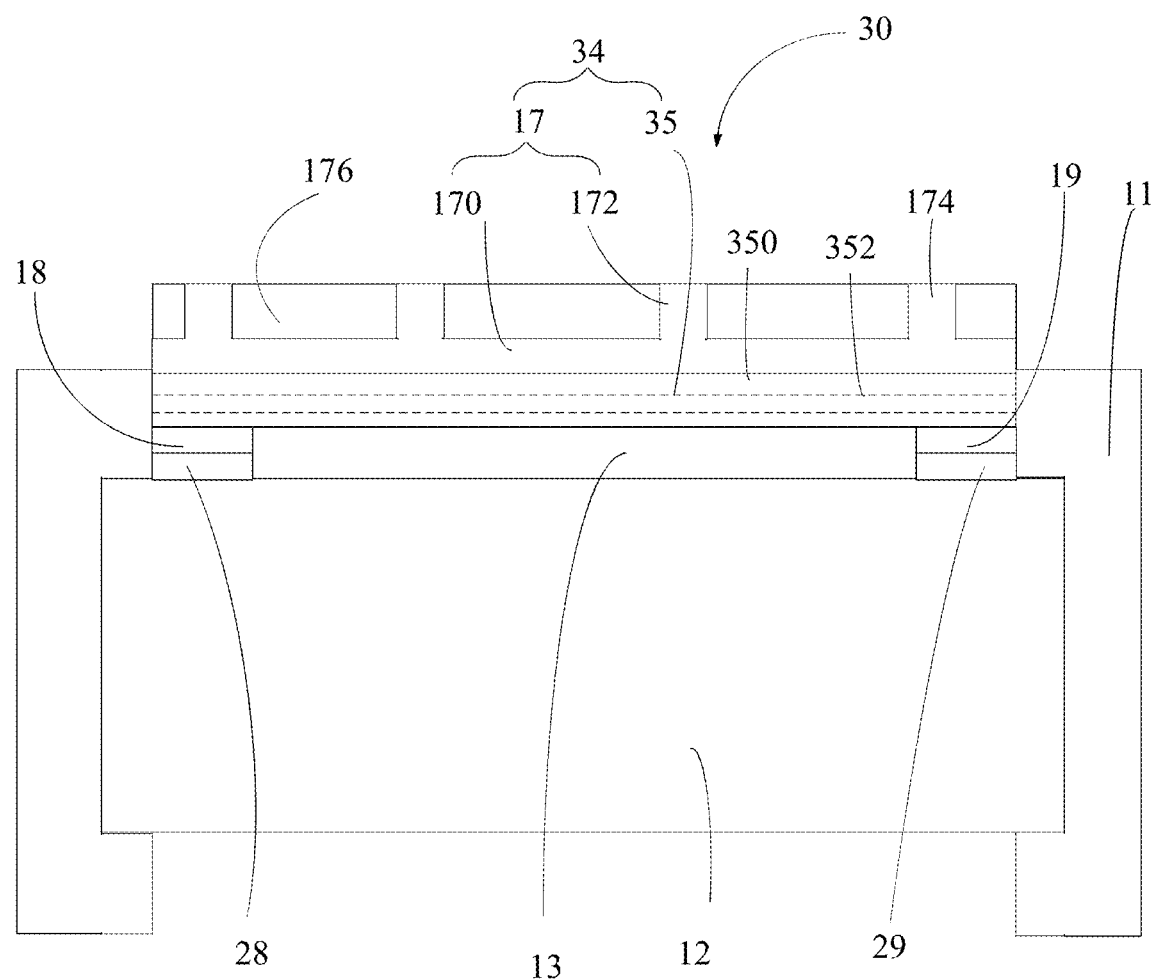
FIG. 14 is a schematic section view of a hydrophobic window of another embodiment.

FIG. 14 shows a hydrophobic window 30 of another embodiment. The hydrophobic window 30 comprises a window frame 11, a glass 22 embedded in the window frame 11, and a hydrophobic film 34 on a surface of the glass 12. The hydrophobic window 30 further comprises a third electrode 28 and a fourth electrode 29 spaced apart from each other and both on the glass 12. The hydrophobic film 34 comprises a flexible substrate 35, a hydrophobic layer 17, a first electrode 18 and a second electrode 19. The hydrophobic layer 17 is located on a surface of the flexible substrate 35. The hydrophobic layer 17 comprises a base 170 and a patterned bulge layer 172 on the surface of the base 170 away from the flexible substrate 35. The patterned bulge layer 172 can comprise a plurality of strip-shaped bulges 174 intersected with each other to form a net-like structure and define a plurality of holes 176. The flexible substrate 45 has electrical and thermal conductivity. The first electrode 18 and the second electrode 19 are spaced apart from each other and both on the surface of the flexible substrate 35 away from the hydrophobic layer 17. The first electrode 18 and the second electrode 19 are both electrically connected to and in direct contact with the flexible substrate 35. The first electrode 18 is also electrically connected to and in direct contact with the third electrode 28, and the second electrode 19 is also electrically connected to and in direct contact with the fourth electrode 29.

Figure 15:
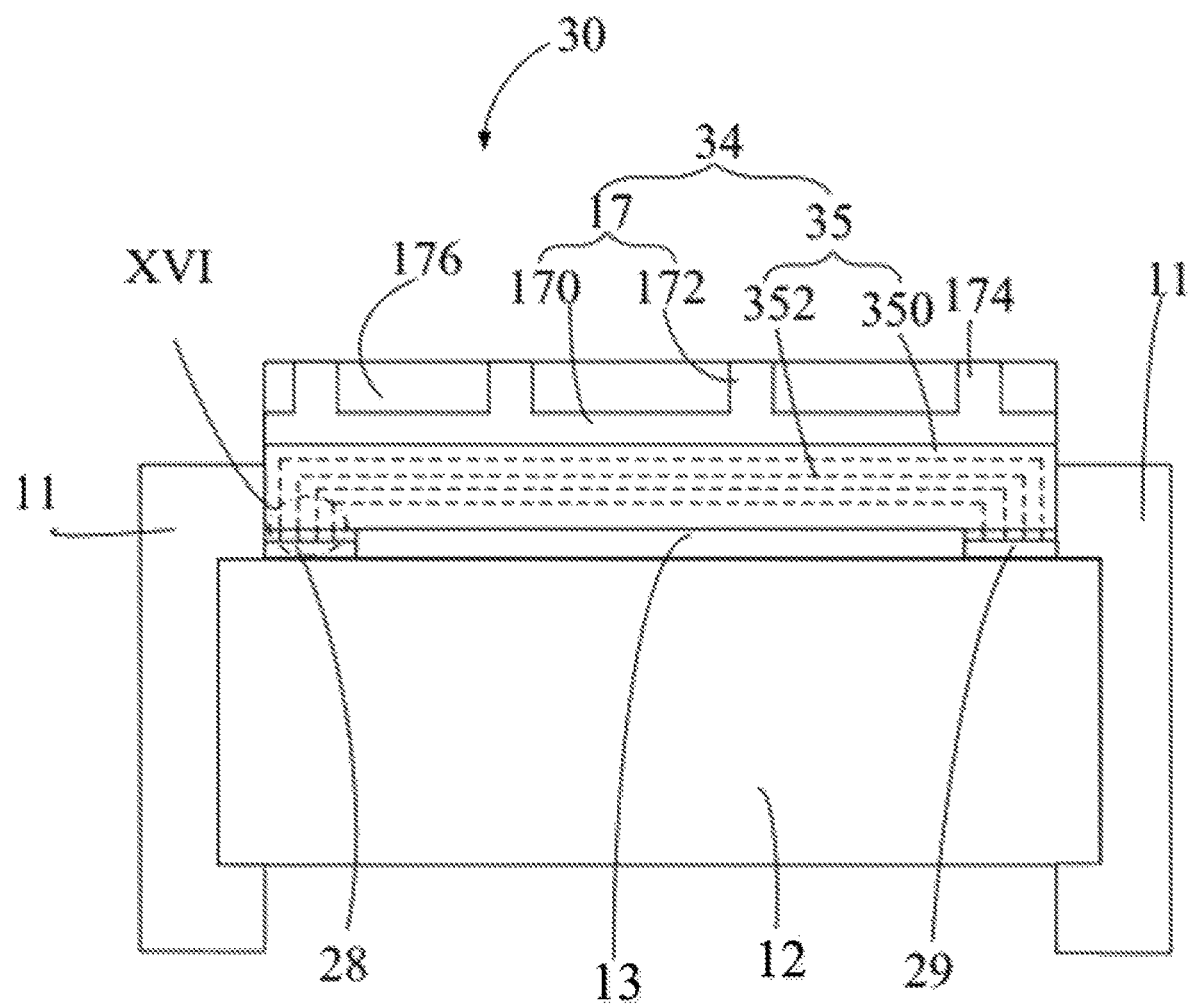
FIG. 15 is a schematic section view of a hydrophobic window of another embodiment.
Figure 16:
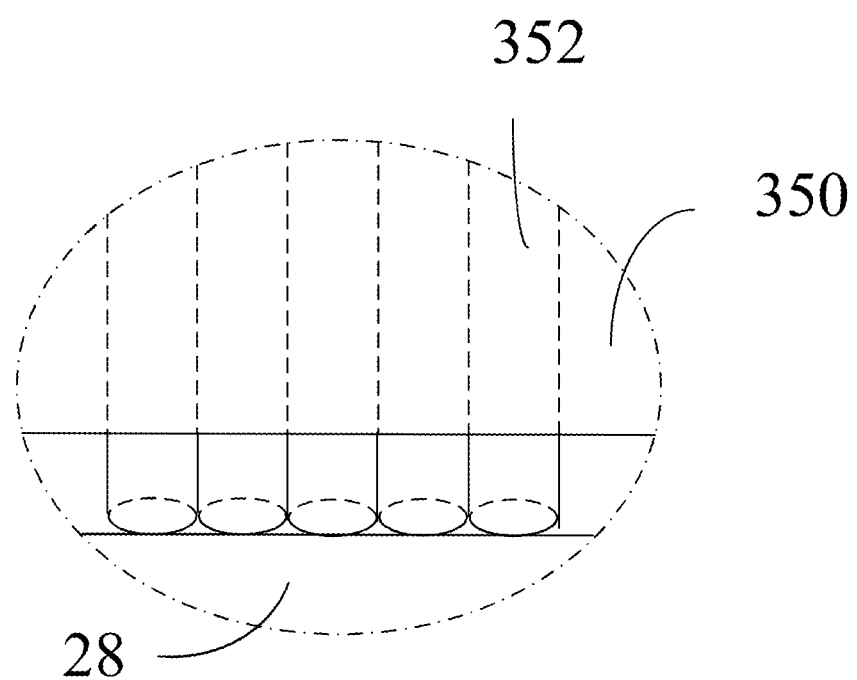
FIG. 16 is a partially enlarged view of circle XVI of FIG. 15.

The hydrophobic window 30 is similar to the hydrophobic window 20 above except that the flexible substrate 35 of the hydrophobic window 30 has electrical and thermal conductivity. In one embodiment, the flexible substrate 35 comprises a polymer matrix 350 and a carbon nanotube structure 352 dispersed therein. The carbon nanotube structure 352 comprises a plurality of carbon nanotubes oriented along preferred orientations in one or several directions. In one embodiment, referring to FIG. 15, some of the plurality of carbon nanotubes are exposed from the polymer matrix 350 and in direct contact with the third electrode 28 and the fourth electrode 29. "Some" means that the ends of the plurality of carbon nanotubes along the length direction are exposed from the polymer matrix 754. The exposed carbon nanotubes are made by bending the ends of the carbon nanotubes which are oriented along preferred orientations in one direction. The exposed carbon nanotubes act as the first electrode 18 and the second electrode 19. Referring to FIG. 16, each carbon nanotube (CNT) has one end protruding out of the polymer matrix 350 to form the first electrode 18.

Figure 17:
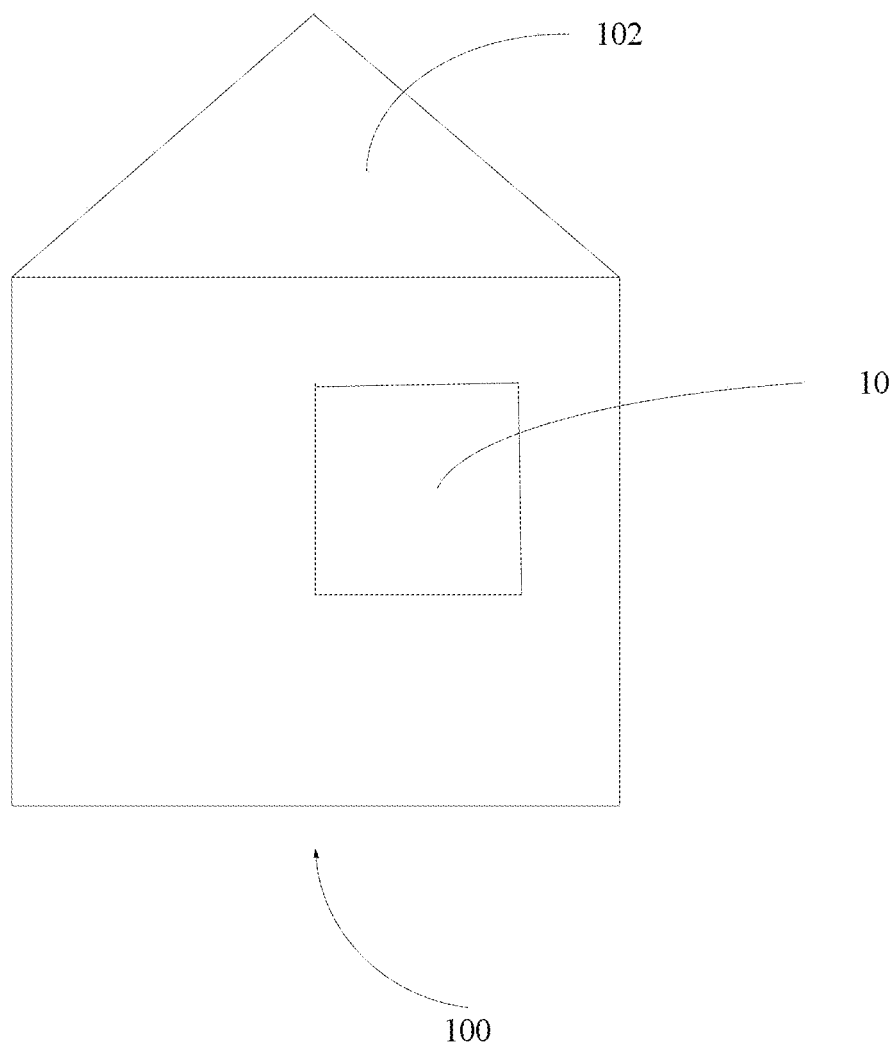
FIG. 17 is a schematic view of a house using the hydrophobic window according to FIG. 1.

FIG. 17 shows a house 100 using the hydrophobic window 10 of another embodiment. The house 100 comprises a house body 102 and the hydrophobic window 10 set in the house body 102.

Figure 18:
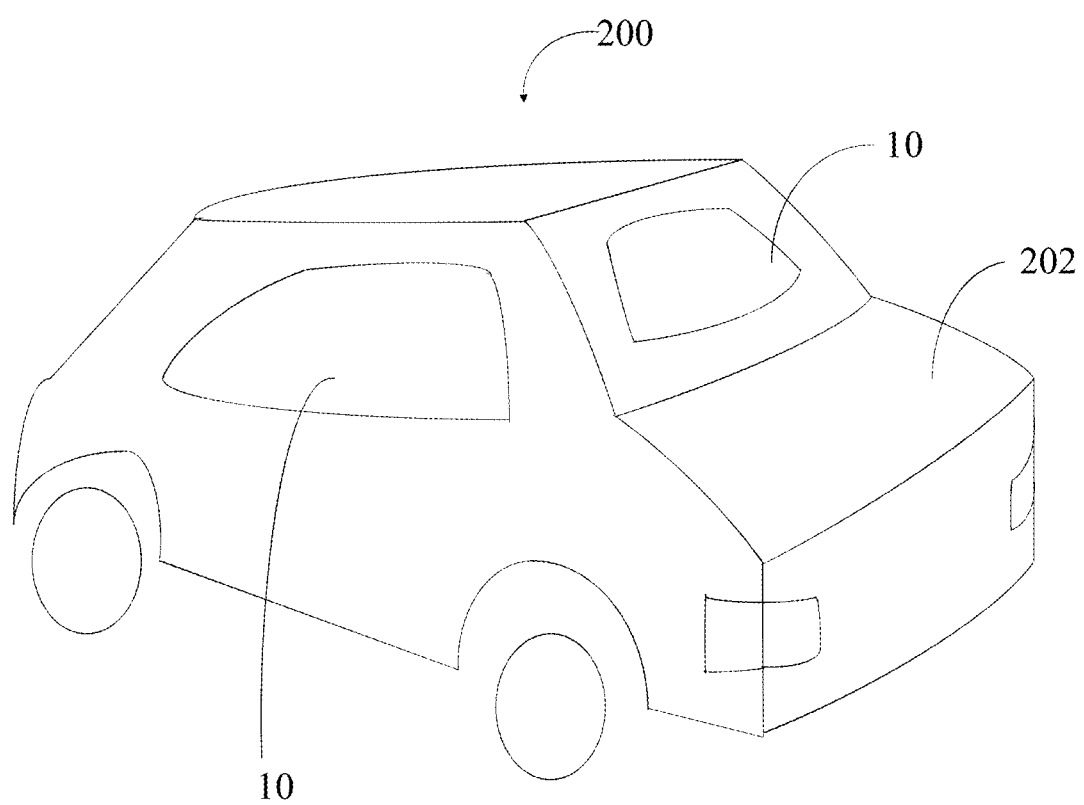
FIG. 18 is a schematic view of a vehicle using the hydrophobic window according to FIG. 1.

FIG. 18 shows a vehicle 200 using the hydrophobic window 10 of another embodiment. The vehicle 200 comprises a vehicle body 202 and the hydrophobic window 10 set in the vehicle body 102.

The application of the hydrophobic window is not limited to vehicles. The hydrophobic window can also be used in other applications such as building windows or other surfaces where hydrophobicity is needed.

The hydrophobic film made by the method as disclosed has the following characters. Firstly, the flexible substrate is a flexible transparent film to make the hydrophobic film have flexibility, so that the hydrophobic film can be attached to a curved surface. Secondly, the hydrophobic property of the hydrophobic will be outstandingly enhanced for the reason that the width and distance of the plurality of strip-shaped bulges are tens of nanometers. Thirdly, the hydrophobic film can also generate heat by electrifying to eliminate ice, frost and rain.

The above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A hydrophobic window, the hydrophobic window comprising:
   a window frame;
   a glass embedded in the window frame; and
   a hydrophobic film on a surface of the glass; wherein the hydrophobic film comprises:
      a flexible substrate;
      a hydrophobic layer on the flexible substrate, wherein the hydrophobic layer comprises a base and a patterned bulge layer on a surface of the base away from the flexible substrate; and
      an adhesive layer between the flexible substrate and the glass.

2. The hydrophobic window of claim 1, wherein the patterned bulge layer is a net structure comprising a plurality of strip-shaped bulges intersected with each other and a plurality of holes defined by the plurality of strip-shaped bulges.

3. The hydrophobic window of claim 2, wherein the plurality of strip-shaped bulges comprises a plurality of first strip-shaped bulges and a plurality of second strip-shaped bulges, the plurality of first strip-shaped bulges are substantially parallel with each other and extend along a first direction, and the plurality of second strip-shaped bulges are substantially parallel with each other and extend along a second direction different from the first direction.

4. The hydrophobic window of claim 3, wherein an angle between the first direction and the second direction is greater than 30 degrees and less than or equal to 90 degrees.

5. The hydrophobic window of claim 2, wherein each of the plurality of strip-shaped bulges has a width ranging from about 25 nanometers to about 600 nanometers and a height ranging from about 75 nanometers to about 800 nanometers, and a distance between adjacent two of the plurality of strip-shaped bulges can range from about 15 nanometers to about 800 nanometers.

6. The hydrophobic window of claim 1, wherein the patterned bulge layer is a two-dimensional array comprising a plurality of bumps spaced from each other and a plurality of grooves defined between the plurality of bumps.

7. The hydrophobic window of claim 1, wherein the hydrophobic film further comprises:
   a heating layer on a surface of the flexible substrate away from the hydrophobic layer;
   a first electrode and a second electrode spaced apart from the first electrode, wherein the first electrode and the second electrode are electrically connected to and in direct contact with the heating layer; and
   the hydrophobic window further comprises a third electrode and a fourth electrode spaced apart from each other and located on the glass, wherein the first electrode is electrically connected to and in direct contact with the third electrode, and the second electrode is electrically connected to and in direct contact with the fourth electrode.

8. The hydrophobic window of claim 7, wherein the heating layer comprises an indium tin oxide layer or a carbon nanotube layer.

9. The hydrophobic window of claim 1, wherein the hydrophobic film further comprises:
   a first electrode and a second electrode spaced apart from the first electrode, wherein the flexible substrate of the hydrophobic film is electrically and thermally conductive, and the first electrode and the second electrode are electrically connected to and in direct contact with the flexible substrate; and
   the hydrophobic window further comprises a third electrode and a fourth electrode spaced apart from each other and located on the glass, wherein the first electrode is electrically connected to and in direct contact with the third electrode, and the second electrode is electrically connected to and in direct contact with the fourth electrode.

10. The hydrophobic window of claim 9, wherein the flexible substrate comprises a polymer matrix and a carbon nanotube structure dispersed therein.

11. A house comprising: a house body, and a hydrophobic window set in the house body, wherein the hydrophobic window comprises:
   a window frame;

a glass embedded in the window frame; and
a hydrophobic film on a surface of the glass; wherein the hydrophobic film comprises:
  a flexible substrate;
  a hydrophobic layer on the flexible substrate, wherein the hydrophobic layer comprises a base, and a patterned bulge layer on a surface of the base away from the flexible substrate; and
  an adhesive layer between the flexible substrate and the glass.

12. The house of claim 11, wherein the patterned bulge layer is a net structure comprising a plurality of strip-shaped bulges intersected with each other and a plurality of holes defined by the plurality of strip-shaped bulges.

13. The house of claim 11, wherein the hydrophobic film further comprises:
  a heating layer on the surface of the flexible substrate away from the hydrophobic layer;
  a first electrode and a second electrode spaced apart from the first electrode, wherein the first electrode and the second electrode are electrically connected to and in direct contact with the heating layer; and
the hydrophobic window further comprises a third electrode and a fourth electrode spaced from each other and located on the glass, wherein the first electrode is electrically connected to and in direct contact with the third electrode, and the second electrode is electrically connected to and in direct contact with the fourth electrode.

14. The house of claim 11, wherein the hydrophobic film further comprises:
  a first electrode and a second electrode spaced apart from the first electrode, wherein the flexible substrate of the hydrophobic film is electrically and thermally conductive, and the first electrode and the second electrode are electrically connected to and in direct contact with the flexible substrate; and
  the hydrophobic window further comprises a third electrode and a fourth electrode spaced apart from each other and located on the glass, wherein the first electrode is electrically connected to and in direct contact with the third electrode, and the second electrode is electrically connected to and in direct contact with the fourth electrode.

15. A vehicle comprising: a vehicle body, and a hydrophobic window set in the vehicle body, wherein the hydrophobic window comprises:
  a window frame;
  a glass embedded in the window frame; and
  a hydrophobic film on a surface of the glass; wherein the hydrophobic film comprises:
    a flexible substrate;
    a hydrophobic layer on the flexible substrate, wherein the hydrophobic layer comprises a base, and a patterned bulge layer on a surface of the base away from the flexible substrate; and
    an adhesive layer between the flexible substrate and the glass.

16. The vehicle of claim 15, wherein the patterned bulge layer is a net structure comprising a plurality of strip-shaped bulges intersected with each other and a plurality of holes defined by the plurality of strip-shaped bulges.

17. The vehicle of claim 15, wherein the hydrophobic film further comprises:
  a heating layer on the surface of the flexible substrate away from the hydrophobic layer;
  a first electrode and a second electrode spaced apart from the first electrode, wherein the first electrode and the second electrode are electrically connected to and in direct contact with the heating layer;
  the hydrophobic window further comprises a third electrode and a fourth electrode spaced from each other and located on the glass, wherein the first electrode is electrically connected with the third electrode, and the second electrode is electrically connected with the fourth electrode.

18. The vehicle of claim 15, wherein the hydrophobic film further comprises:
  a first electrode and a second electrode spaced apart from the first electrode, wherein the flexible substrate of the hydrophobic film has electrical and thermal conductivity, and the first electrode and the second electrode are electrically connected to and in direct contact with the heating layer; and
  the hydrophobic window further comprises a third electrode and a fourth electrode spaced apart from each other and located on the glass, wherein the first electrode is electrically connected to and in direct contact with the third electrode, and the second electrode is electrically connected to and in direct contact with the fourth electrode.

19. A hydrophobic window, the hydrophobic window comprising:
  a window frame;
  a glass embedded in the window frame; and
  a hydrophobic film on a surface of the glass; wherein the hydrophobic film comprises:
    a flexible substrate;
    a hydrophobic layer on the flexible substrate, wherein the hydrophobic layer comprises a base and a patterned bulge layer on a surface of the base away from the flexible substrate, the base and the patterned bulge layer are an integrated structure, and the base and the patterned bulge layer comprise a material selected from a group consisting of silicon dioxide, silicon nitride, gallium nitride, and gallium arsenide.

20. The hydrophobic window of claim 19, wherein a thickness of the base ranges from about 70 nanometers to about 280 nanometers.

* * * * *